(12) United States Patent
Beach et al.

(10) Patent No.: US 12,123,690 B2
(45) Date of Patent: *Oct. 22, 2024

(54) INTEGRATED POLYMER AND METAL CASE AMMUNITION MANUFACTURING SYSTEM AND METHOD

(71) Applicant: Cybernet Systems Corp.

(72) Inventors: Glenn J. Beach, Grass Lake, MI (US); James Burkowski, Northville, MI (US); Amanda Christiana, Ann Arbor, MI (US); Trevor Davey, South Lyon, MI (US); Charles J. Jacobus, Ann Arbor, MI (US); Joseph Long, Ypsilanti, MI (US); Gary Moody, Dexter, MI (US); Gary Siebert, Dexter, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,873

(22) Filed: Jun. 27, 2023

(65) Prior Publication Data

US 2024/0027175 A1   Jan. 25, 2024

Related U.S. Application Data

(63) Continuation of application No. 17/120,216, filed on Dec. 13, 2020, now Pat. No. 11,686,564, which is a
(Continued)

(51) Int. Cl.
*F42B 33/00* (2006.01)
*F42B 5/285* (2006.01)
(Continued)

(52) U.S. Cl.
CPC ........... *F42B 33/001* (2013.01); *F42B 5/285* (2013.01); *F42B 5/307* (2013.01); *F42B 5/313* (2013.01);
(Continued)

(58) Field of Classification Search
CPC .......... F42B 5/285; F42B 5/307; F42B 5/313; F42B 33/001; F42B 33/002; F42B 33/0207; F42B 33/04
See application file for complete search history.

(56) References Cited

U.S. PATENT DOCUMENTS 3,153,976 A * 10/1964 Linder ................. F42B 33/004
86/26
4,475,435 A * 10/1984 Mantel ................ B65G 59/062
86/44
(Continued)

FOREIGN PATENT DOCUMENTS

GB         461253 A  *  2/1937  ................ F42B 7/12

*Primary Examiner* — Bret Hayes
(74) *Attorney, Agent, or Firm* — Fishman Stewart PLLC

(57) ABSTRACT

A fully automated, integrated, end-to-end synchronized and compact manufacturing system produces polymer or metal case ammunition. Manufacturing stations support case assembly, sealing (gluing/welding), final product inspection, cartridge packaging or binning, and loading. Station modularity facilitates rapid changeover to accommodate ammunition of differing calibers. Sensors and apparatus may be provided to place a manufacturing cell in a wait state until all components or materials are received in a preferred orientation for proper assembly. The system may join and use multipart cases, each including a lower portion with a head end attached thereto and at least one upper portion having a necked-down transition to the open top end.
(Continued)

Elevator feeders, vibratory bowl feeders, and robotic pick-and-place feeders may be used to deliver components for assembly.

17 Claims, 18 Drawing Sheets

Related U.S. Application Data continuation of application No. 13/835,352, filed on Mar. 15, 2013, now Pat. No. 10,907,943.

(51) Int. Cl.

| | |
|---|---|
| *F42B 5/307* | (2006.01) |
| *F42B 5/313* | (2006.01) |
| *F42B 33/02* | (2006.01) |
| *F42B 33/04* | (2006.01) |
| *B65G 47/14* | (2006.01) |
| *B65G 47/71* | (2006.01) |

(52) U.S. Cl.
CPC ........ *F42B 33/002* (2013.01); *F42B 33/0207* (2013.01); *F42B 33/04* (2013.01); *B65G 47/1435* (2013.01); *B65G 47/71* (2013.01)

(56) References Cited

U.S. PATENT DOCUMENTS

| | | | | |
|---|---|---|---|---|
| 5,900,574 | A * | 5/1999 | Hart | F42B 33/004 86/39 |
| 6,460,464 | B1 * | 10/2002 | Attarwala | F42B 5/36 102/470 |
| 10,907,943 | B2 * | 2/2021 | Beach | F42B 33/001 |
| 11,686,564 | B2 * | 6/2023 | Beach | F42B 33/002 86/28 |
| 2005/0056183 | A1 * | 3/2005 | Meshirer | F42B 5/025 102/466 |
| 2008/0053297 | A1 * | 3/2008 | Koskela | F42B 33/10 86/27 |

* cited by examiner

INTEGRATED POLYMER AND METAL CASE AMMUNITION MANUFACTURING SYSTEM AND METHOD

REFERENCE TO RELATED APPLICATIONS

This application is a Continuation of U.S. patent application Ser. No. 17,120,216, filed Dec. 13, 2020, now U.S. Pat. No. 11,686,564, which is a Continuation of U.S. patent application Ser. No. 13/835,352, filed Mar. 15, 2013, now U.S. Pat. No. 10,907,943, the entire content of all Related Applications being incorporated herein by reference.

TECHNICAL FIELD

This invention relates generally to polymer- or plastic-cased and also metal cased ammunition and, in particular, to an integrated system and method to manufacture such ammunition.

BACKGROUND

Ammunition manufacturing automation dates back over 100 years. The principal manufacturing machines are called "Loaders" or Ammunition Loaders. Current generation models include the Mark L, X, and LP from Ammo Load Worldwide, the inline ammunition loader from Advanced Engineering Systems, and various ammunition loader models from Camdex Automatic Ammunition Systems. Generally these machines are fed by two rotary bowl feeders that feed oriented metal (brass, nickel or steel) cases and bullets or balls. Cases are fed into a linear production line first and then primers feed into the machine through straw-like tubes or magazines and are pressed into the cases. The primer case is then filled with propellant fed from an overhead canister or jar, and then the bullets are pressed into the top of the case and crimped. Completed rounds are then dropped out of the machine. Small variations on this concept are implemented by all of the above-referenced machine manufactures.

Search of the US patent literature shows that this loading concept has evolved over time. Boschi 4,031,804 describes a shot shell reloading system that while manually operated include a rotary staged assembly concept that includes a cam operated sequence of operations that fully reloads shot shell cases. Dillon 4,163,410 describes an improved manually actuated shell reloader, also employing a rotary staged design that provides all the essential functions for shell reloading. Leich 4,228,724 of Bloomfield Hills, Michigan, in 1980 describes one of the first modern automatic loader design concepts, similar in form to that made by Ammo Load Worldwide, Camdex, and Advanced Engineering Systems. This machine stages the assembly process along a cam driven linear set of stages, but does not disclose the operational feeders. All inputs (cases, bullets, and primers) are loaded through vertical tube magazines, presumably manually placed by the operator. Leich describes a variety of relevant assembly mechanisms, presses, sliders, and propellant dispensing means. Lee 4,292,877 discloses an alternative architecture for loading shot gun shells and, in particular, an improved method to dispense propellant or shot during the reloading process. Shields 6,772,668 discloses a rotary table based reloader that incorporates a feeding mechanism that charges the rounds in a staged manner.

Improvements in the modern machines of Ammo Load Worldwide, Camdex, and Advanced Engineering Systems are primarily combining these previous loader machine concepts with modern programmable controls and automated rotary bowl feeders for casings and bullets. The feed means for propellant and primers are essentially unchanged from Leich's earlier machines.

As in most fields of endeavor, innovation is driven by new applications. Plastic cases lighten the cartridge by at least ⅓ and offer a potentially lower cost per cartridge. At the same time plastic cases offer more accuracy on target due to the better bullet casing release process that plastic cases can deliver. In terms of prior art, Scanlon 3,745,924 discloses a casing that is composed of a plastic case with a rear header composed of plastic compressed between a metal head opening and an outer metal ring. Similar to Scanlon, Hale 3,874,294 discloses a design for high pressure cartridges that also use a casing that a plastic case with a rear header composed of plastic compressed between a metal head opening and an outer metal ring. Scanlon 3,990,366 refines this idea by including a forward metal casing member to reinforce the case and to absorb heat. Scanlon's composite cases required relatively expansive plastic at the time of his last disclosure and his addition or metal parts was a compromise to reduce this requirement.

Eckstein & Moyer 4,065,541 describe a method for making a primer seal for a one-piece plastic shot gun shell which is less demanding, but similar design to that described from Hale and Scanlon. Vatsvog U.S. Pat. Nos. 5,033,386, 5,151,555, and 5,259,288 describe high powered plastic cased cartridge concepts that use a single plastic case with neck-down feature in a single piece where a two piece metal head-end assembly introduces a metal baffle to regulate and control pressure within the plastic chamber and crimp-on and glued metal header end Vatsvog also provides a good index of even earlier relevant art.

Husseini et al. 6,752,084 describe a plastic case similar to that of Vatsvog which uses a metal header that is crimped-on and glued over the plastic upper. Husseini also discloses that the header and case are serrated to achieve better pressure holding. The newest Husseini disclosures discuss non-metallic base construction, the casing upper molded over the bullet, and specifics regarding the feature of an over molding injection process.

Chung 7,610,858 describes even a more complex structure that inserts a third case component between the plastic upper and the metal head-end piece to provide a better crimp for high pressures. Chung's latest disclosure shows a four piece structure with crimp or glue-over bases or heads— clearly Chung's earlier plastic cases had problems with holding high pressures associated with rifle rounds so he has been modifying his initial concepts to mitigate these problems.

Trivette 8,186,273 describes a new plastic casting architecture similar to the one we have built manufacturing automation to support. This system is based on new and improved high temperature tolerant plastics that allow injection molding of the rear part of the rifle case directly around the metal header over a set of groves in the metal that support high pressure in the chamber.

Maljkovic and Rushing 8,240,252 disclose the first truly modern plastic casing. Their approach which was first filed in 2005 describes a three part case which has an injection molded neck-down upper case piece, a lower injection molded lower case piece, and a metal (typically steel) header over which the lower case is molded. The key to this construction is a plastic material with notched Izod impact value greater than 10 ft lbs/in and a ratio of notched Izod impact value at room temperature to about −40° C. of less than 4. This concept discloses that the head-end metal include structure for case extractor grove, primer pocket, and serrated top so that the injected plastic over this provides a good pressure seal and grip.

Conceptually similar to the Malikovic approach, Burrow, Klein, and Padgett et al. (PCP Ammunition) describe alternative versions of polymer cased ammunition that mold a case lower over a metallic head end and complete the case by inserting a molded case upper held in place by glue or plastic weldment between the upper case and the lower case. In particular, Klein and Padgett et al. describe polymer ammunition like that disclosed by Maljkovic for the commercial market, but using a proprietary formulation. Published U.S. Application No. 2012/0180688 describes Padgett's specific manufacturing process wherein attachment of case upper and lower is carried out through "ultraviolet (UV) light weld process or heat cured resin, a spin weld, or an ultrasonic weld." A manufacturing process is diagrammed which entails the steps of inserting a metal head, inserting a plate, molding the case lower over the head, molding the case upper, welding the case lower and upper together, loading cases, bullets, primers, and powder into an auto-loading machine (as would be done for normal brass cased ammunition) and optionally applying adhesives or sealants. Interspersed are inspection steps, the last of which effect ammunition grading.

SUMMARY

This invention resides in a fully automated, integrated, end-to-end synchronized and compact manufacturing system to produce polymer and metal case ammunition. A comprehensive embodiment includes manufacturing process stations that support case assembly, sealing, and full in-process, final product inspection and cartridge packaging or binning, and loading. The preferred embodiment includes modular stations facilitating rapid changeover to accommodate ammunition of differing calibers.

A basic system for manufacturing polymer and metal case ammunition in accordance with the invention includes a case feeder for receiving and conveying cylindrical polymer cases, each case including a bottom portion with a head end attached thereto and an open top end. A primer feed and insert station receives primers and inserts one of the primers onto the head end of each case through the open end of that case. A propellant fill station fills each case with propellant through the open end of that case. A bullet feeder station inserts a bullet into open end of each case, and a crimping station attaches the bullets to the case to produce assembled rounds of ammunition.

The system is "loosely synchronized" in the sense that one or more of the stations includes sensors and apparatus to place the station in a wait state until all components or materials needed by that station are received. The various feeders may include sensors and other apparatus to ensure that components such as cases are conveyed in a preferred orientation. The cases may be mulitpart cases, each including a lower portion with a head end attached thereto and at least one upper portion having a necked-down transition to the open top end. To facilitate assembly, the system further includes a first feed station for delivery of the lower portions, at least one subsequent feed station for delivery of the upper portions, and a case assembly station operative to receive the lower and upper case portions from the feed stations and join the lower and upper case portions. The upper and lower portions may be metallic or polymeric, with the other portion being metallic or polymeric.

Different types of feeders may be used in accordance with the invention, including elevator feeders, vibratory bowl feeders, and robotic pick-and-place feeders. Shaped tracks may be employed to orient cases, case parts, or other components into a desired orientation for preferred assembly. Also unique to polymer ammunition, a sealing station may be provided to apply a glue or other bonding agent to the regions of attachment of bullets and/or primers. Such glue or other bonding agent may include ultraviolet light (UV) cured adhesives, thermally cured adhesives, ultrasonic welding, and fiction welding.

An automated inspection station may be provided to checks physical parameters of the ammunition and reject rounds that do not meet predetermined characteristics. Such parameters may include overall profile, outer surface quality, placement or centering of bullet and placement or centering of primer. A sortation machine may be used to divert the ammunition into different lots based upon quality, and a packaging machine may be provided to load acceptable rounds of ammunition into boxes or containers.

DETAILED DESCRIPTION

Figure 1:
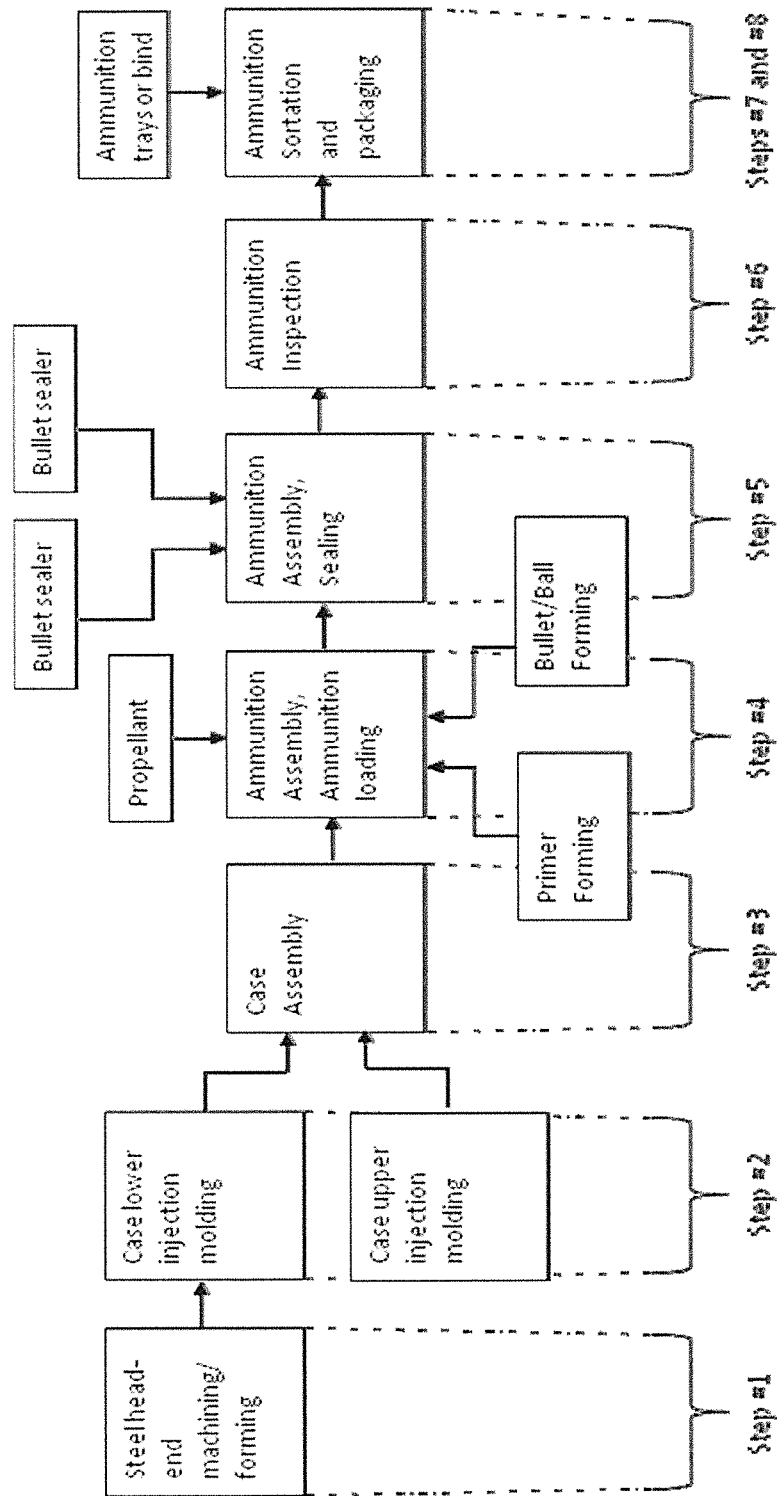
FIG. 1 diagrams a fully automated and integrated compact manufacturing line for polymer cartridges.

Compared to conventional rounds that use brass, nickel or steel (metal) cases, polymer ammunition is a potentially lower cost, lighter weight, and more accurate alternative. However, supporting this emerging technology requires a new set of manufacturing stations, methods and techniques. This disclosure describes a fully automatic manufacturing system and method for polymer-cased ammunition, including injection molding re-purposed for polymer case manufacturing; at least four new manufacturing process machines that support case assembly, sealing, and full in-process, final product inspection and cartridge packaging or binning; and a more conventional ammunition loading machine that is modified to support a fully automated manufacturing line. The disclosed fully automatic manufacturing system also supports conventional metal case ammunition or ammunition that is a combination of metal and polymer cased. FIG. 1 diagrams a fully automated and integrated compact manufacturing line for polymer cartridges according to the invention, with important steps described in further detail below.

Step #1—Head End Metal Manufacture

Figure 2A:
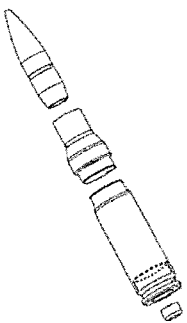
FIG. 2A illustrates alternative polymer case architectures.
Figure 2A:
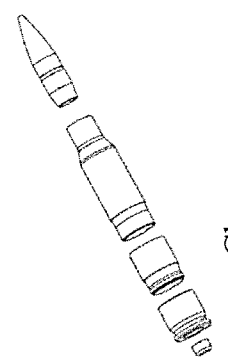
Figure 2A:
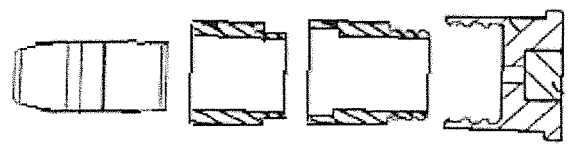
Figure 2A:
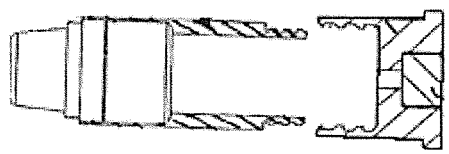
Figure 2A:
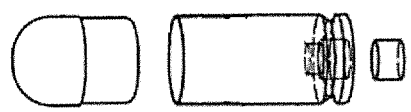
Figure 2B:
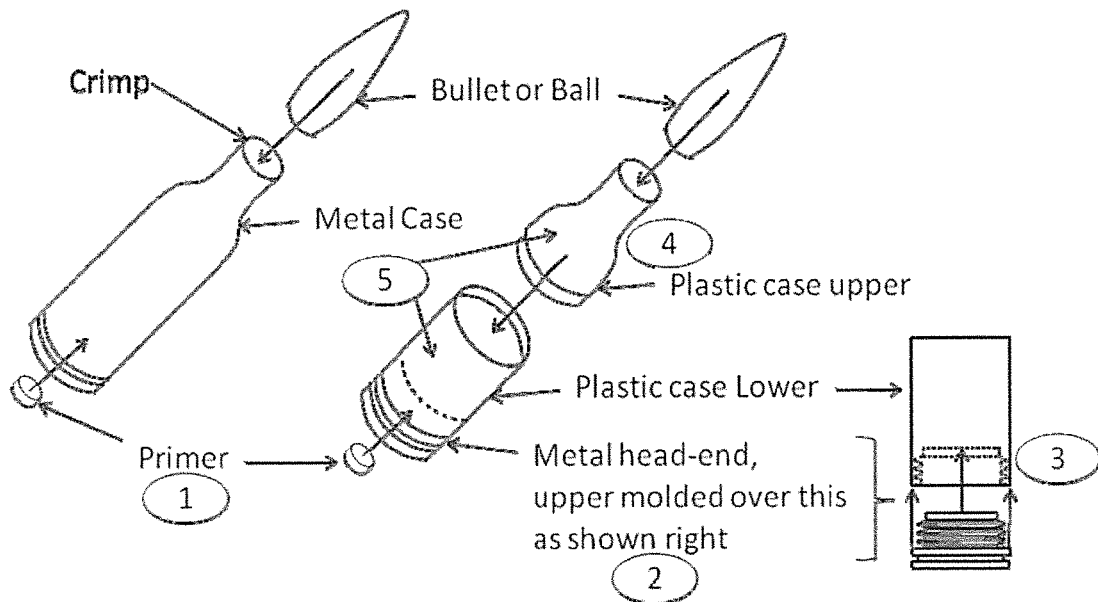
FIG. 2B compares a metal case and a polymer case structure.

Polymer ammunition replaces the brass, nickel or steel (metal) ammunition casing with a case made from an injection molding manufacturing process. Alternative polymeric case architectures that have been disclosed or patented are shown in FIG. 2A. FIG. 2B compares a metal case and a polymer case structure. In both cases, because the casings must provide press-fit and features for insertion of the primer (1), the head end is typically made of a hard and heat tolerant material: metal plug of brass, nickel or steel (metal), ceramic with these primer insertion features (2). This head end part can be made through molding, forging, milling, or lath turning from common brass or steel rod stock, without the complex metal forming necessary for the more conventional brass, nickel or steel (metal) full casing. For conventional metal cases the head end is an integral part of the case formed as part of the process that forms the entire case.

Step #2—Injection Molding of the Case Parts

Continuing the reference to FIG. 2B, if the case is for a pistol type round with a mouth diameter the same as size as the internal diameter of the casing, the polymer casing can be built in one step of injection molding for the case around the metal head end (3) with a single old having a retractable insert. If the cartridge is typical of rifle rounds where the bullet is a smaller diameter than the diameter of casing, then the casing has to support necking down to the bullet diameter as shown in (4). Since cylindrical injection mold that incorporate retractable inserts must be removed from an opening in the final part that allows the largest diameter of the insert to be removed, it has been common to build plastic rifle cases in two parts (5).

The part molded over the head end may be built similarly to a pistol round casing with a simple injected plastic case molded over the head-end metal part (3). Then the neck-down case feature is made in a second injection molded step (4). These two parts are built with indented radii to that they can be assembled by placing one part into the mouth of the other part and affixed either by glue or laser plastic welding (5). After assembly of these two parts, the plastic rifle round case is approximately the same as its brass or metal counterpart.

For other round types like those shown in FIG. 2A, this process is replicated for each part (for example, the type described by Chung with more than two case components that must be injected for in some other way formed). Some round types like those described by Husseini begin by molding the upper case around the bullet rather than molding the lower case around the head-end. Fundamentally, all of these variations are similar with additional molds required and alternative metal or ceramic head or bullet pieces having to be inserted into the mold prior to injection and provision indentation features for press assembly and attachment gluing or weldment in subsequent steps).

For compound cases that include metal case parts, these case parts are formed using a wide variety of forming methods including forging, turning, polishing, pulling, rolling, crimping, welding, machining, heat treatment, etc. Conventional cases are usually made by a sequence that starts with forging a cup shape from brass or steel, pulling the cup sides to length and thinness, crimping the mouth end and heat treating it to desired hardness, and finally machining grooves and primer pocket in the head end.

Step #3—Rifle Case Assembly (Not Required for Piston Rounds)

Figure 3:
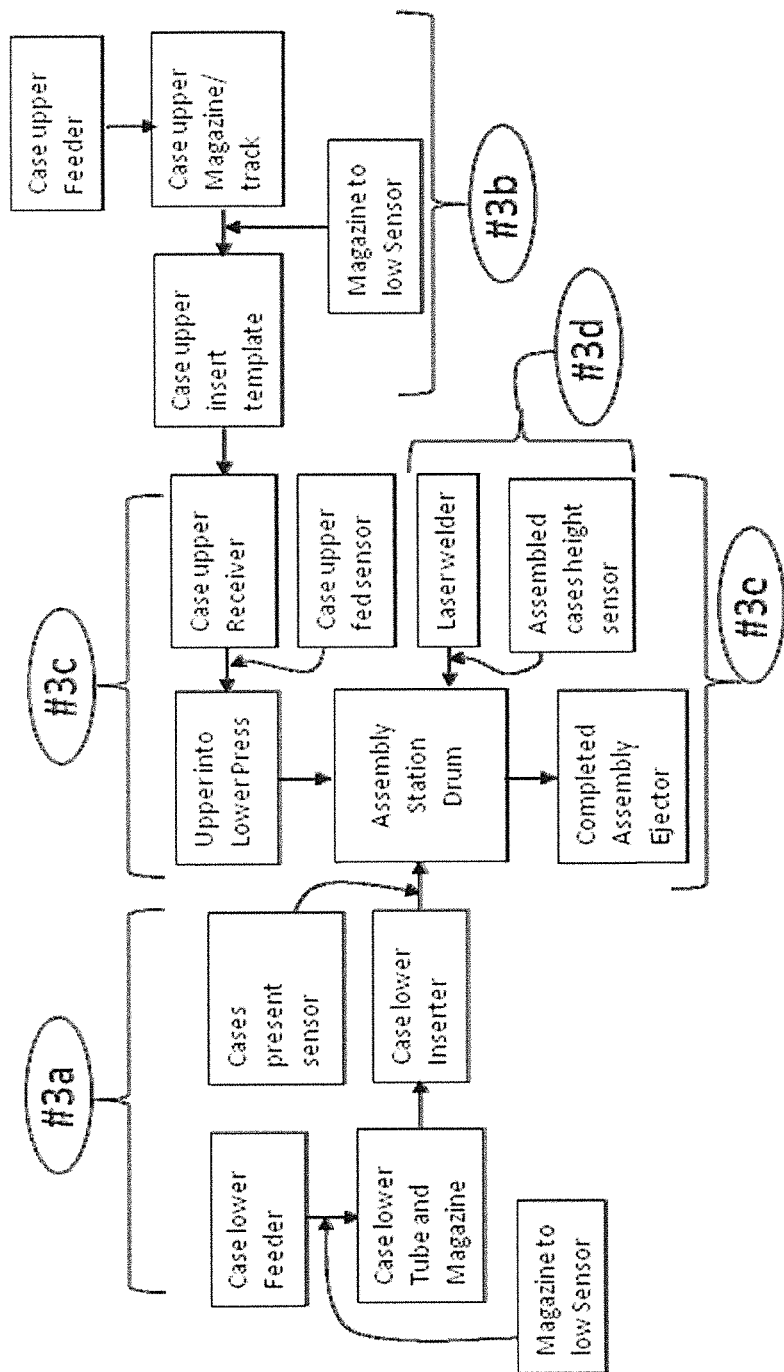
FIG. 3 is a flow diagram of a case assembly machine.

The basic machine architecture for case assembly shown in FIG. 3 provides for attachment of two case components. For cases requiring more than two components, this basic type of machine is repeated n−1 times for each of n components that must be inserted and attached. The output of each machine is a partially assembled item which feeds to the next machine as input feed and a new component which is assembled to this. The basic machine architecture includes feeder systems for two types of parts, the case bottom prior to assembly that includes the head end metal plug (or all previously assembled components if more than two parts), and the next case part. In the two-part case (4) and (5) shown in FIG. 2B, the case top provides the neck-down feature.

Figure 4:
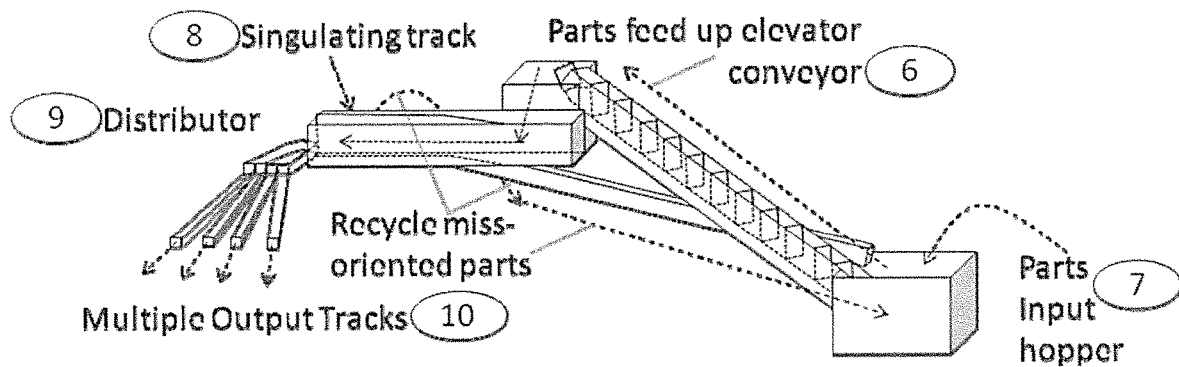
FIG. 4 is a schematic of an elevator feeder.
Figure 5:
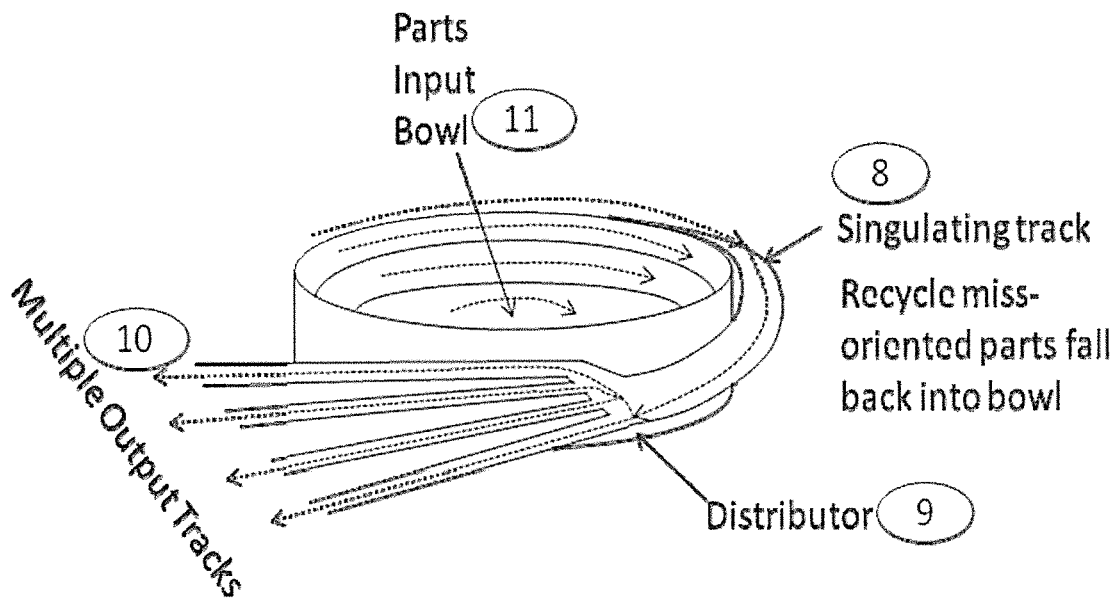
FIG. 5 shows a bowl feeder.
Figure 6:
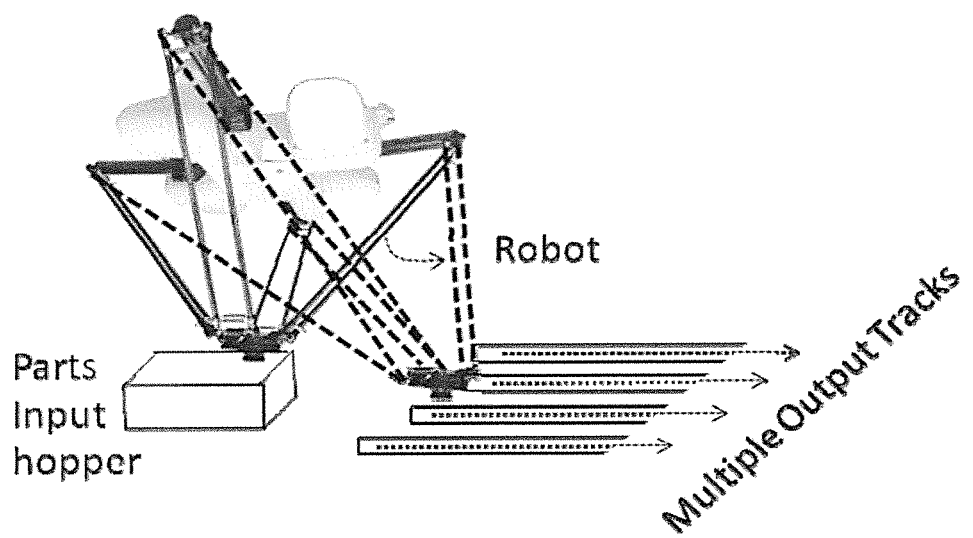
FIG. 6 depicts a robotic pick and place system which could also be implemented with a different architecture such as SCARA or serial link.

Several types of feed systems can be employed, including elevator feeders (FIG. 4) with a shaped track (8) to orient case uppers and case lowers into a standard orientation for insertion into the assembly machine, vibratory bowl feeders (FIG. 5) that also provide shaped track (8) to orient case uppers and case lowers into a standard orientation for insertion into the assembly machine, or high-speed robotic pick and place (FIG. 6) to acquire a case upper or lower part and place it one piece at a time or multiple pieces at once into the assembly machine.

Step #3a—Feeding Lower Cases to Assembly

Figure 7:
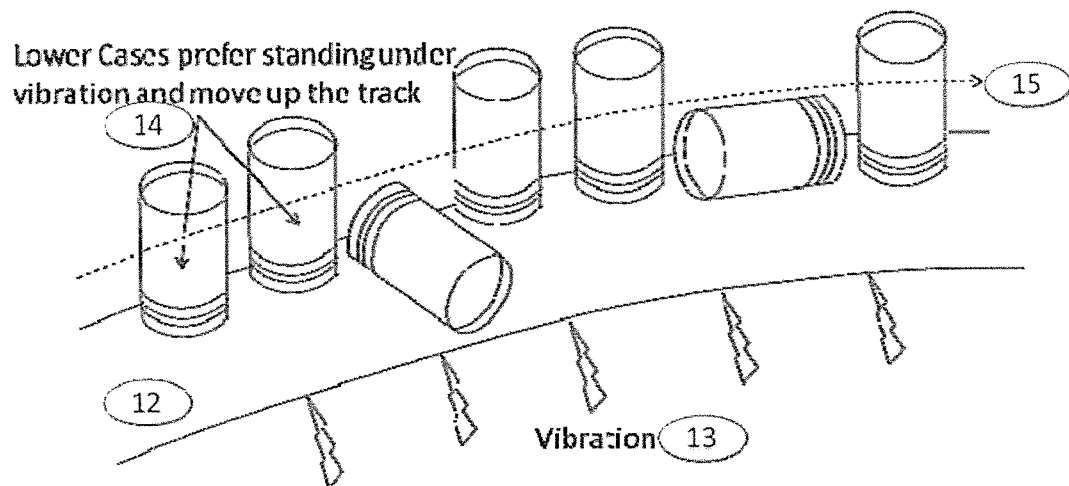
FIG. 7 illustrates lower cases moving under vibration, preferably from a vertical orientation.
Figure 8:
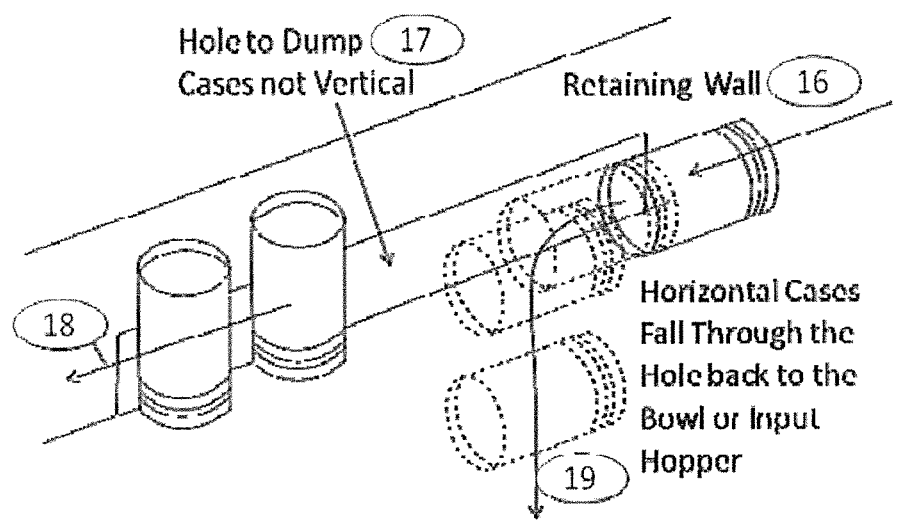
FIG. 8 shows non-vertical cases falling through a slot on a retaining wall.

A bowl feeder (FIG. 5) or elevator feeder (FIG. 4) is used to move bulk lower cases around or along a track (8)(10). The elevator does this "handful" by "handful", whereas the bowl feeder provides a continuous feed. Referring to FIG. 7, because the case bottoms are bottom heavy due to the metal insert, they have a preferred vertical orientation (14) which can be achieve much of the time by placing build case bottoms on a vibratory track (12)(13) that also causes them to walk in a preferred direction (15). This track (12) is slightly slanted to support the case bottoms falling into a single file against a retaining wall (16). The cases that are not in the preferred orientation (i.e. those that land on their sides), fall through holes (17) in the retaining wall that are sized to pass vertical parts (18), and dump back into the feeder (19) along with parts that are on their sides (FIG. 8). Different feeder mechanisms may use many similar "tricks" for feeding similar parts in standard orientations which are employed depending on input part or assembly geometrical characteristics.

Figure 9:
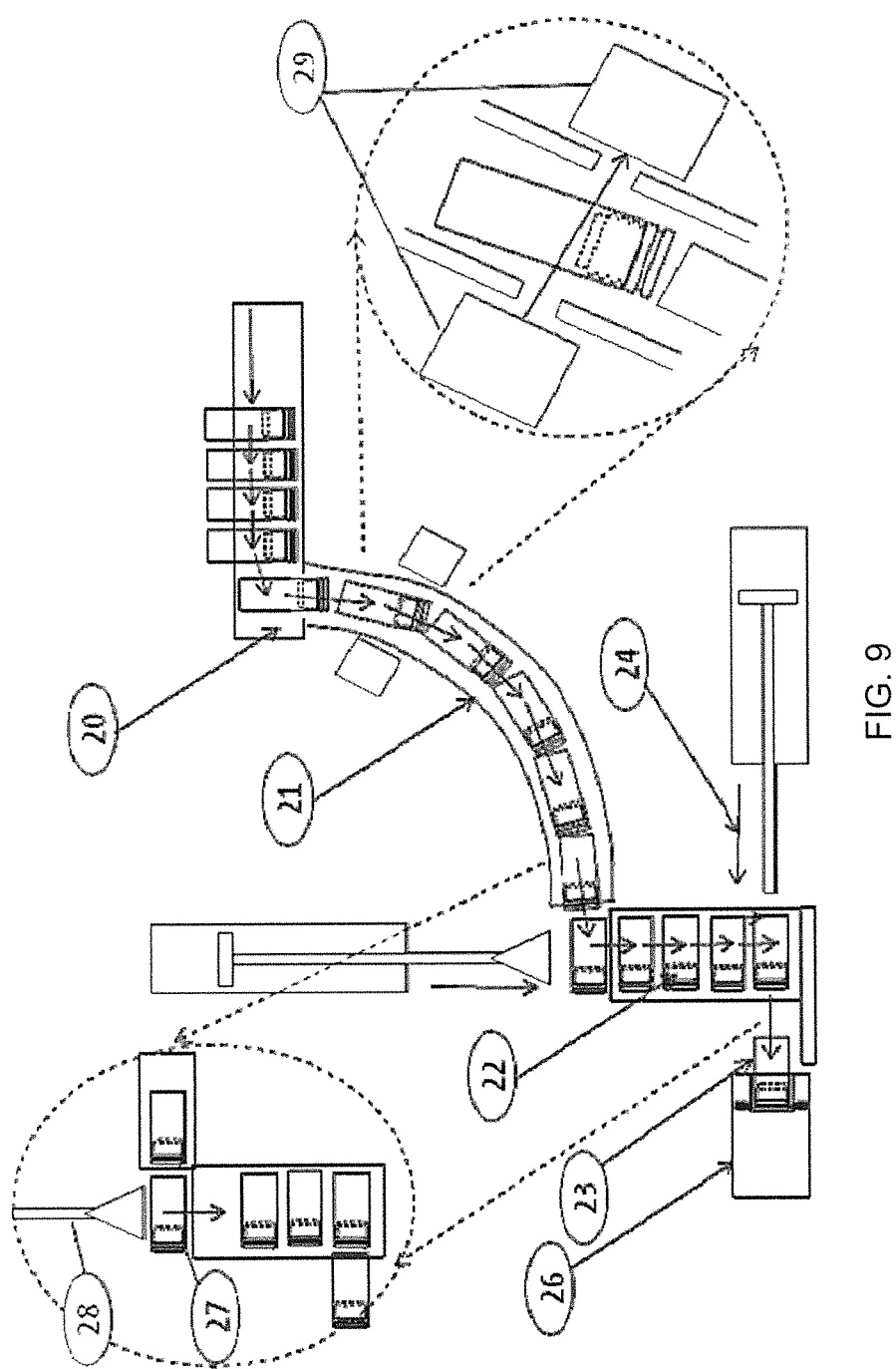
FIG. 9 diagrams the delivery of parts from the feeder to the assembly station socket.

The vertical parts proceed to a distributor (9) that supports parallelizing the case assembly process into multiple feed lanes (10). The preferred embodiment runs four assembly lanes in parallel (10), but this could be limited to three, two or one or could have more than four lines. The parts are then fed into the assembly machine through a drop-hole (20), feed tube (21), and a stacked magazine (22) for each lane (FIG. 9). Alternative embodiments could include alternative feed mechanisms, such as part gates that push a part into a transport line, feeding parts as vertical or as shown in the horizontal orientation (23) at the end point, and may implement the magazine or buffer function differently. A key element shared by all these alternative mechanisms is that the part feed rate may not exactly match the assembly machine operating rate so a magazine or buffer is used to match rates over time.

As shown in FIG. 9, each magazine (22) is fed by a tube (21), and holds four case lowers. The feed cycle is that a vertically oriented case lower falls into the feed tube through the drop hole (20) at random when parts are available and directly over the hole pushed from the feed system and there is room in the tube. The parts then move or fall down the tube (21) and land over a spring loaded magazine in a horizontal orientation (23), heavy metal head end first. The once per assembly cycle, a case lower is pushed out of the bottom of the magazine into an assembly station socket (26) with an air or electric linear actuator push rod (24), and the rest of the case lowers in the magazine fall (25), making one new position available. The case lower resting at the top of the magazine (27) which came in from the feed tube (21) is pressed into the spring loaded magazine with a push plate actuated by air or electric linear actuator (28). This cycle repeats for each assembly machine cycle.

Figure 10:
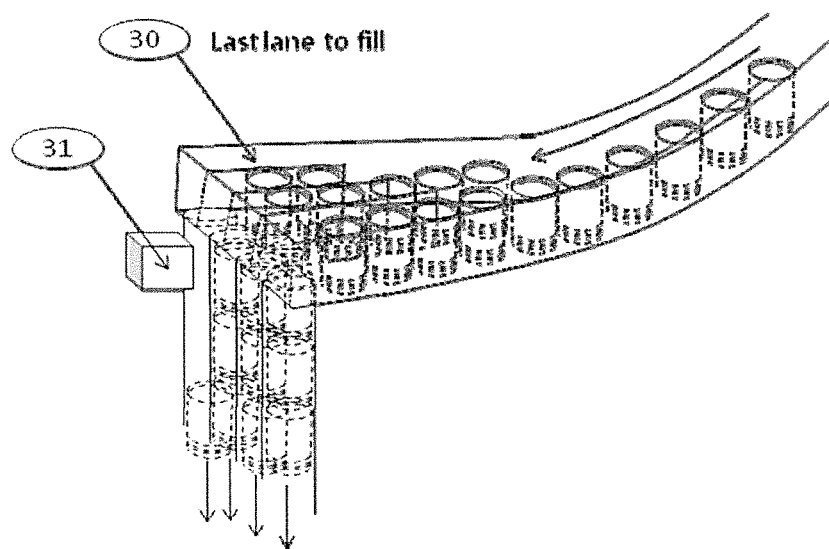
FIG. 10 depicts empty magazine sensing.
Figure 11:
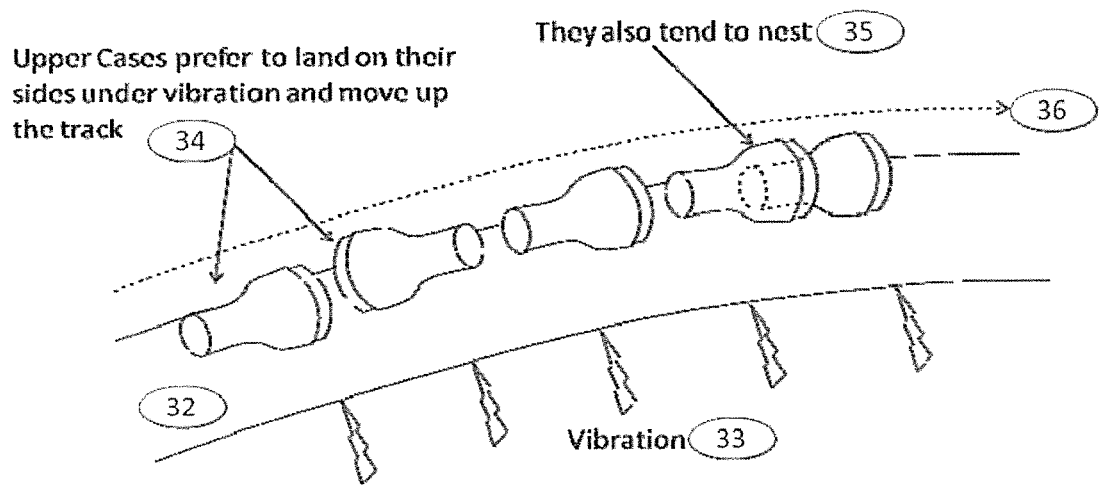
FIG. 11 shows upper cases move under vibration, including horizontal orientation and nesting.
Figure 12:
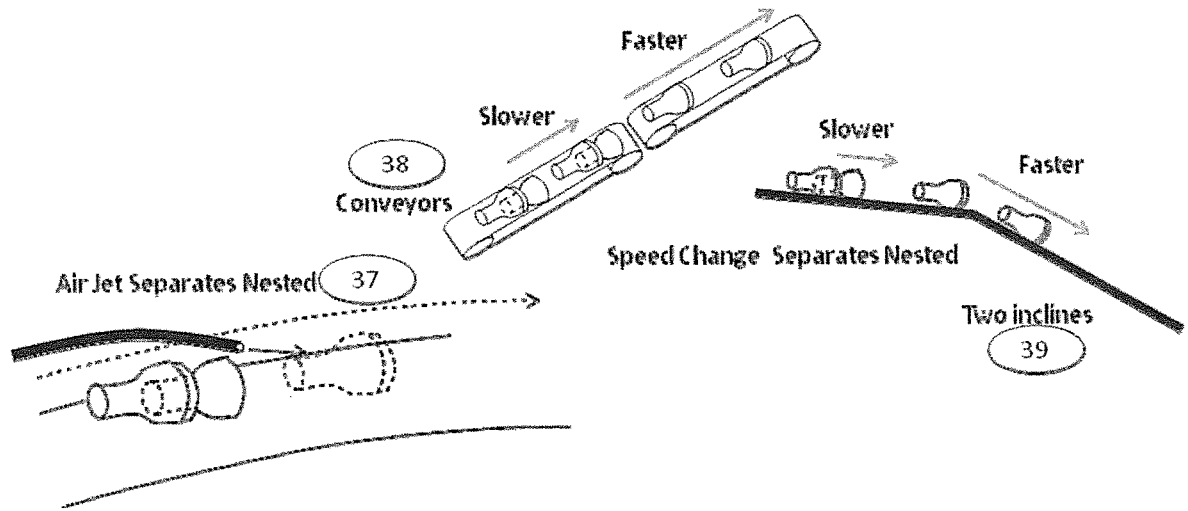
FIG. 12 illustrates alternative approaches for separating nested case uppers.
Figure 13:
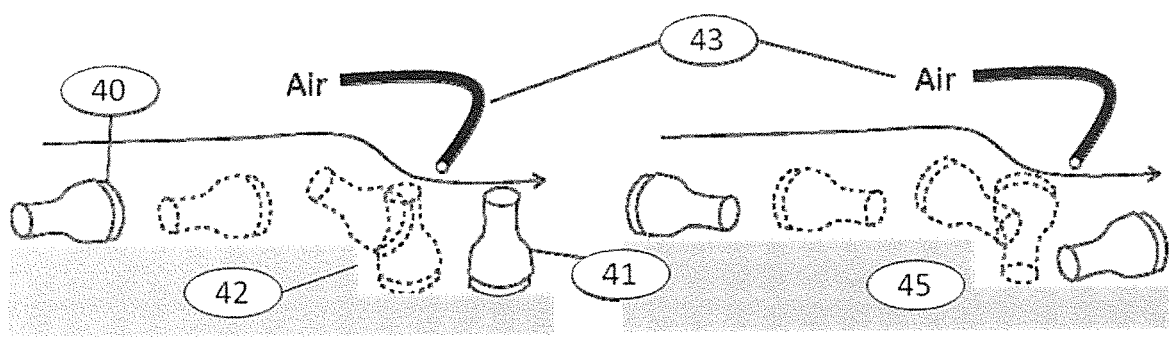
FIG. 13 depicts flipping case uppers onto their large diameter base.

Since the feed system may run out of parts or might run slower than the assembly machine, especially at the end of batches, it is important to provide a sensor in the feed tube/magazine chain (29) that allows the assembly machine to stop its process to wait for a full set of parts before the assembly process is initiated. For a four-channel machine, this can be accomplished by placing a part present/absent sensor into the magazine sequence at a point in the magazine feed tube on one feed tube only. This is possible because the distributor (FIG. 10) has a preferred order of magazine and feed tube filling, so one particular tube (30) is always the last to be filled and the first to be filled with fewer than the full number of parts. Sensing (31) this tube allows the assembly machine to safely assure that it will have enough parts for its next case assembly cycle.

Step #3b—Feeding Case Uppers to Assembly

A bowl feeder (FIG. 5) or equivalent elevator feeder (FIG. 4) is preferably used to move bulk upper cases around or along a race (32). The elevator does this "handful" by "handful," whereas the bowl feeder provides a continuous feed under vibration (33). Added case parts to be assembled into the case assembly, like case bottoms, are almost always lighter and often longer in length than diameter. Therefore they prefer to orient under vibration on their sides (34). If they are not uniformly cylindrical, as shown in this configuration, some of them insert into each other because one end is smaller in diameter than the other (35). The cases moving horizontally along the race (36) can be induced to separate if the leading case in a line is made to move faster. This can be carried out through a pressurized air jet (37). Alternatively, this may be accomplished by moving from a lower speed conveyor to a higher speed one (38), or from a slow track to a faster one on an incline (39).

Figure 14:
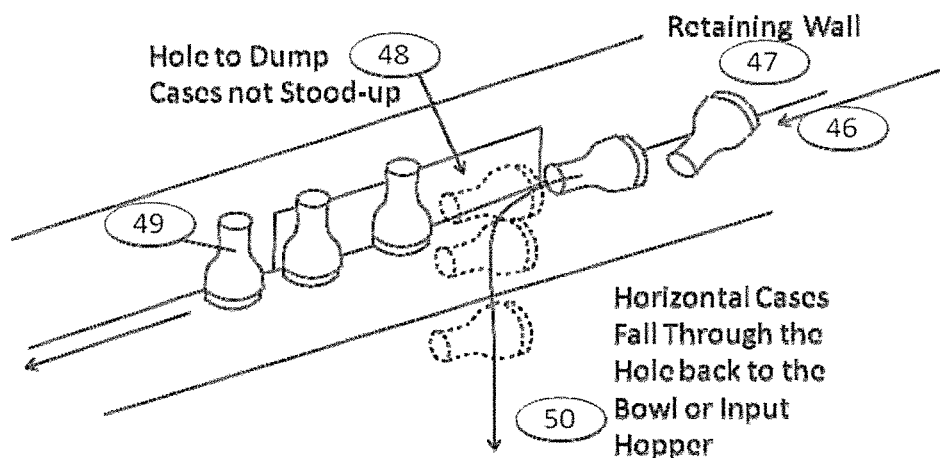
FIG. 14 shows how case uppers not stood-up fall through a slot on a retaining wall.

The singulated cases that are moving large end to small end (40) can be induced to stand-up on their larger diameter ends if a stage (41) is provided that flips them down onto their larger ends (flip-up orienter). This is done through a complex shape feature (42) and strategic air pressure that pushes down the large end (43). Rounds that are flipped and lead with the short end will not stay up because this position in not highly stable (45). As shown in FIG. 14, once the rounds are stood up, they move single file along a slight slanted vibrating race (46) against a retaining wall (47). The ones that either fall over or have not been stood, and are still horizontal, fall through holds (48) in the retaining wall (47) that are sized to pass vertical standing parts (49), but dump back into the feeder parts that are on their sides (50).

The vertical parts proceed from the bowl feeder (51) to a distributor (52) that supports parallelizing the case assembly process into multiple feed lanes (53). One embodiment (FIG. 15) runs four assembly lanes in parallel, but this could be limited to three, two or one or could have more than four lines. Then the parts are fed into the assembly machine through a linear magazine that is in two parts, the first a vibratory set of tracks (54) that pushes rounds forward by a left/right vibratory action, and then tracks (55) that use air jets to push rounds along and into the assembly station. This may alternatively be implemented as a single stage, or stages implemented as electric conveyor belts, chain conveyors, or a high speed robotic pick and place. A key element shared by all these alternative mechanisms is that the part feed rate may not exactly match the assembly machine operating rate so a magazine or buffer is required to match rates over time.

Figure 15:
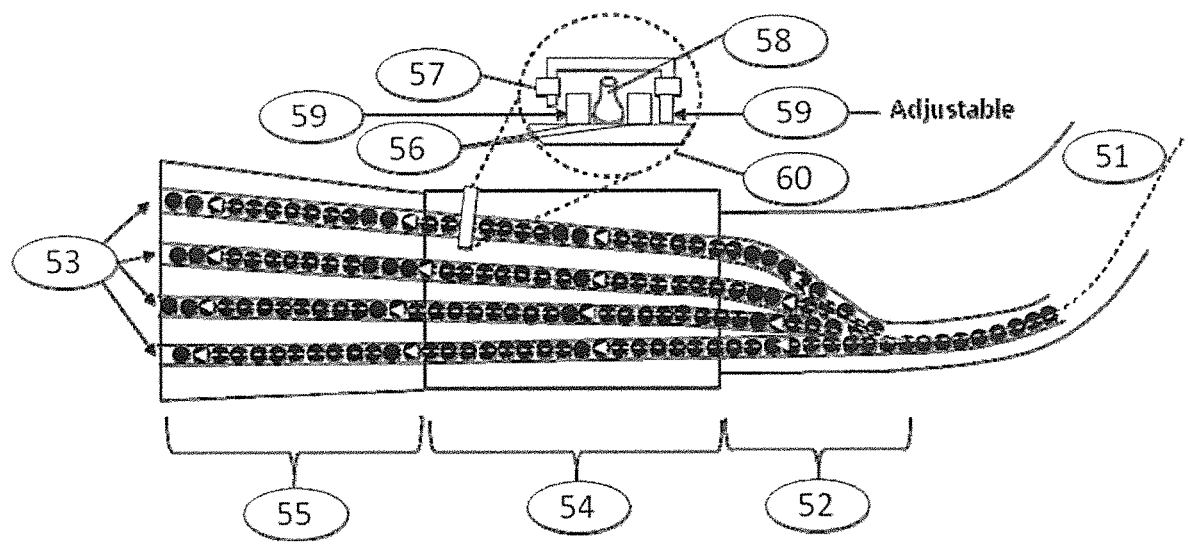
FIG. 15 shows how a distributor feeds a two stage set of four linear magazines; or in this implementation, 'tracks'.

Referring to FIG. 15, the air moved tracks (55) are fed by a constant stream of parts from the feeder (51) and distributor (52), and pushed through the vibratory tracks (54) from the feeder. The rails shown vertically (54) and (55) and head-on (56) are adjustable (59) for different case sizes. The air actuated tracks are tied to the assembly machine feed cycle. When the assembly station insertion receiver is closed (61), parts have been (by the last cycle) pushed by air up to the input position (63). The insertion receiver is then opened (62) by translating a bar (64) by electric or air linear actuation. The air action pushes the next part into the insertion position (65) through the input template (66). Then the bar (64) translates to closed (61) pushing (67) this part into the insertion receiver block (68) and positions the next part to the input position. Once a part is in the receiver block (68), a linear actuator pushes (69) the case upper (70) into an awaiting case lower (72). This cycle repeats for each assembly machine cycle.

Referring back to FIG. 15, since the case upper feed system may run out of parts or might run slower than the assembly machine, especially at the end of batches, it is important to provide a part present or absent (58 shows part present) sensor (57) in the feed track magazine chain (54) (55)(58) that allows the assembly machine to stop its process to wait for a full set of parts before the assembly process is initiated. For a four-channel machine, this can be accomplished by placing a part present/absent sensor into the feed magazine (or track) sequence at a point on one track only (60). This is possible because the distributor (52) has a preferred order of magazine and track filling, so one particular track is always the last to be filled and the first to be filled with fewer than the full number of parts. Sensing this magazine/track allows the assembly machine to safely assure that it will have enough case uppers for its next case assembly cycle.

Step #3c—Case Uppers Assembled to Case Lowers

Figure 16:
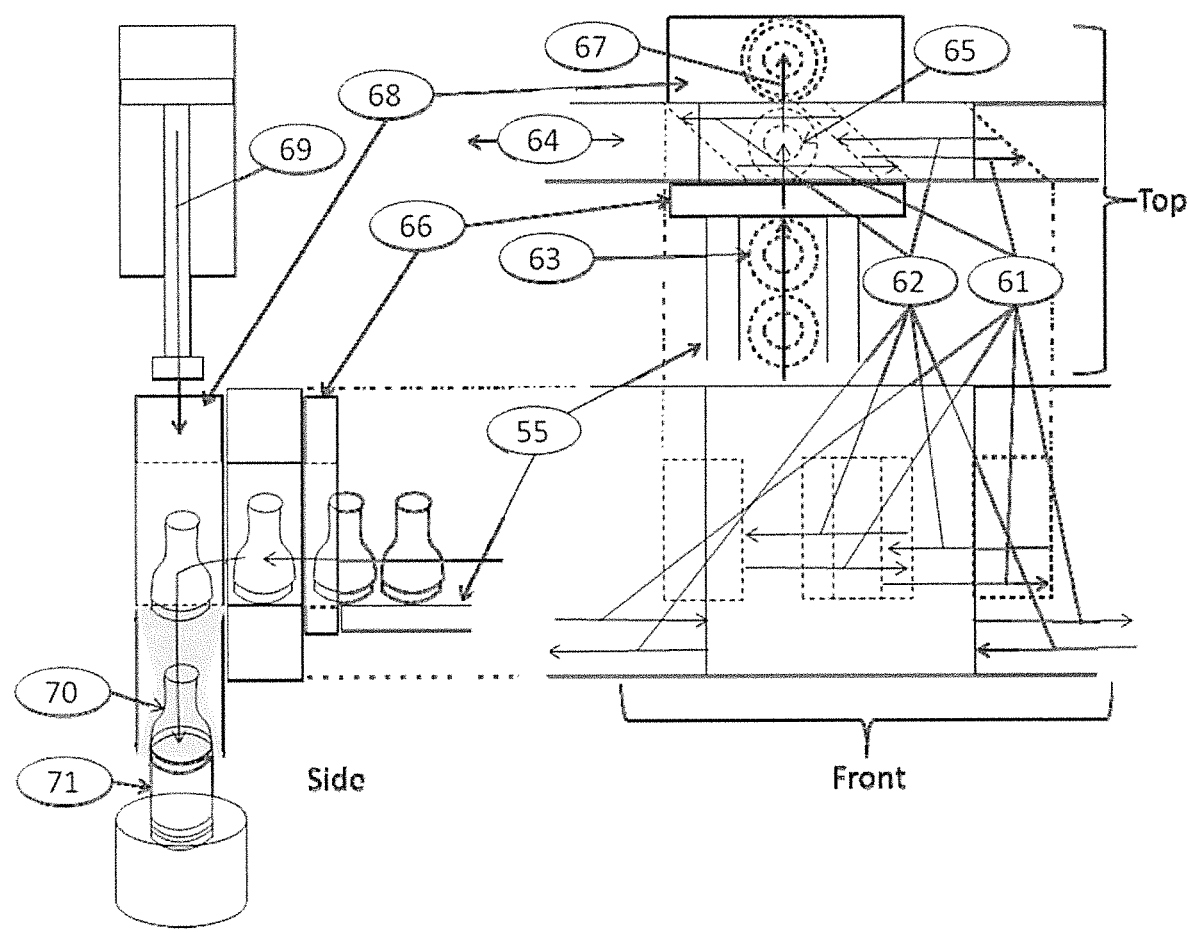
FIG. 16 illustrates the insertion of a part into an insertion receiver block.
Figure 17:
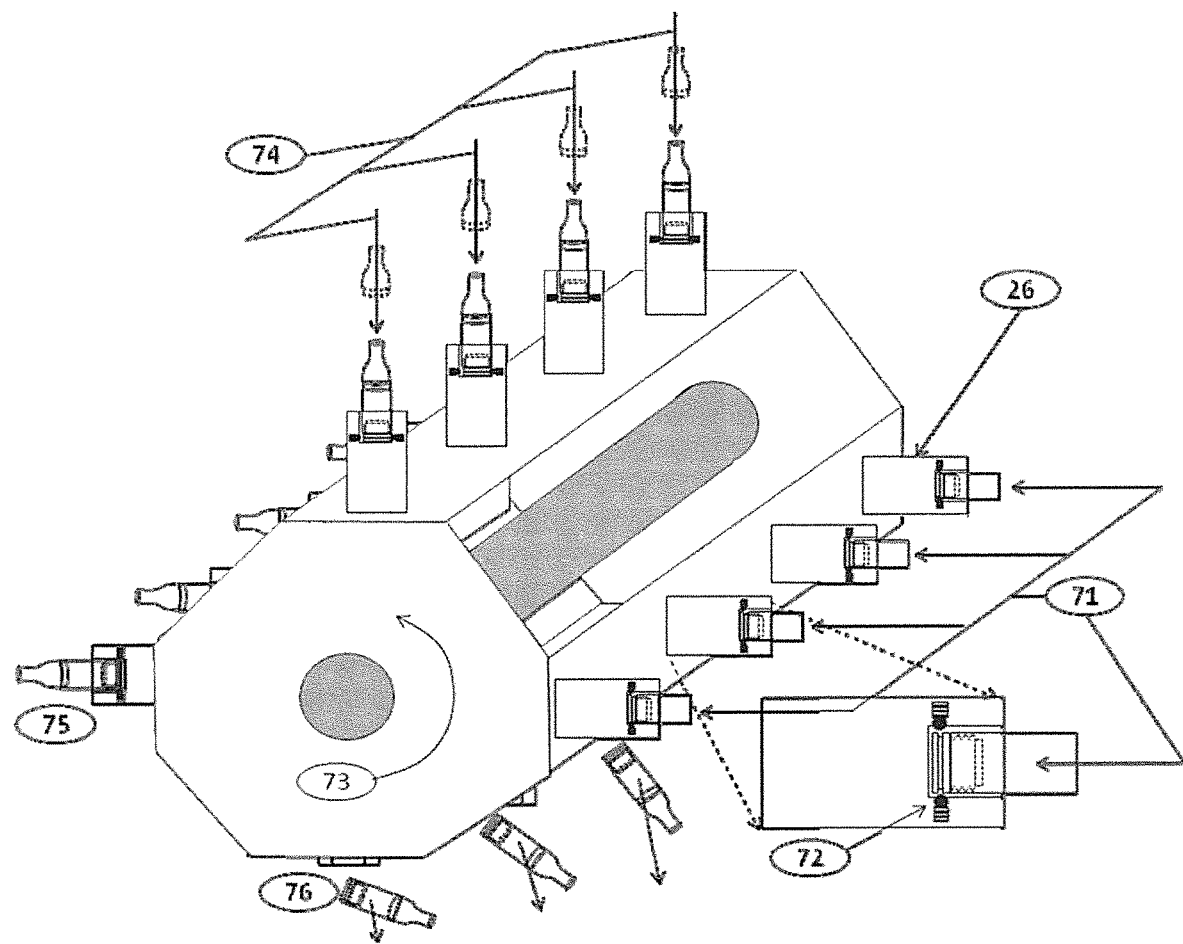
FIG. 17 is an oblique drawing that shows an assembly process and drum.

Referring now to FIGS. 16 and 17, case lowers are pushed from the loading position (71) in the input magazine into the assembly station socket (26) and retained there with spring loaded ball bearings (72) that grasp the machined case extractor grove. After four are loaded (which on an alternative machine could be 1, 2, 3, 4 or more), the drum (73) rotates the case uppers in line with the case upper insertion receiver blocks (68). In parallel the receivers have been loaded with four case uppers so that when alignment is complete, a set of linear actuators (air or electric) push the uppers into the lowers (FIG. 16) and (74). They are temporarily kept in place through fiction between the upper and lower case sections. The drum then rotates to the case affixment stage (75) and the ejection stage (76). While these stages operate synchronously and in parallel to achieve system throughput, it is also possible to move from station to station synchronously and in parallel if a turn table system or a linear translation system or line is used.

Step #3d—Case Uppers and Lowers Affixed

Figure 18:
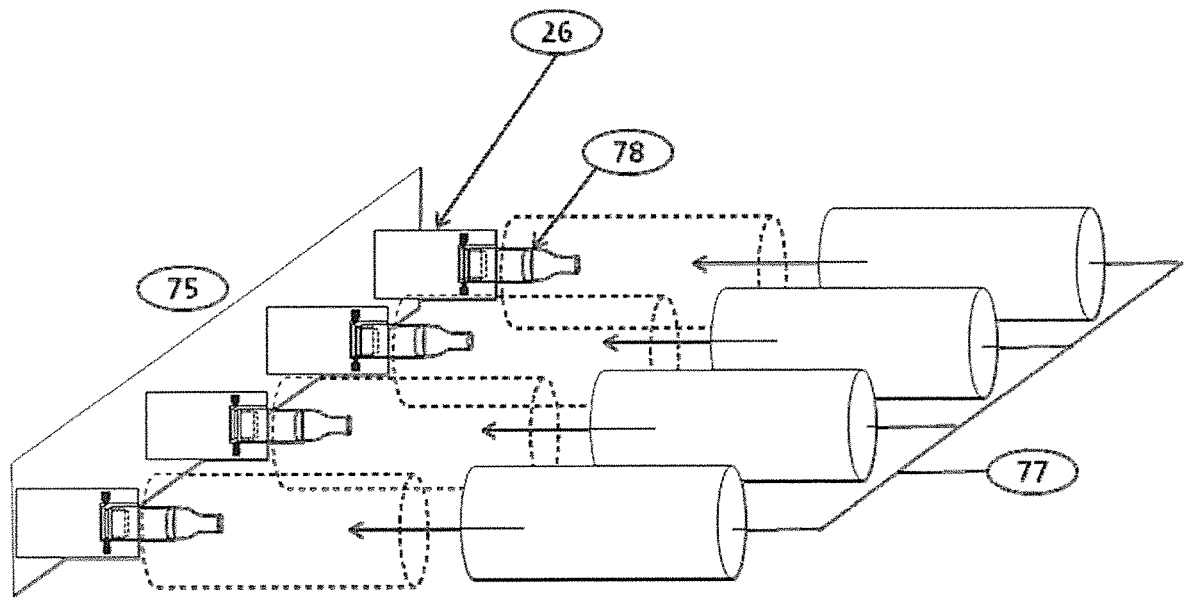
FIG. 18 depicts a laser welding affixment.

Alternative means for affixing case lowers to uppers include but are not limited to gluing, laser welding spin friction welding or ultrasonic welding, or others. To effect gluing, assembled cases are placed under a glue dispensing nozzle, a drop of glue is dispensed, and wicks around and into the case upper/lower interlocking features (perhaps UV or thermally cured). Referring to FIG. 18, to effect laser weldment, a laser welding head (77) is translated for positioning around the overlapping area between the uppers and lowers (78). The laser heats the plastic to melding and the two parts plastics are intermixed and welded. The laser can be mechanically swept around the interface, the part can be rotated in front the welding laser at the correct rate, or as is done in the embodiment of FIG. 18, the laser light can be diffused and spread around the part over 360 degrees by optics so that the part need only be exposed to the laser to effect welding. The part remains in the assembly station socket, is rotated using a drum to the welding station and the laser welding bells (77) are positioned over the part.

Step 3e—Assemble Cases Gauged and Elected to the Cartridge Assembly Process

The case assembly machine includes a number of sensor checks for correct assembly. For example, there are sensors on both feed systems to assure that there will be the proper number of case uppers and lowers for each assembly step. Case lowers are checked to ensure that there are a full set before proceeding to case upper and lower assembly. There is a check to determine that the case uppers are fed through and assembled on to the lowers correctly. There is a case height check that is performed as part of translation of the laser welding station into the correct position for case halves weldment. And finally, at the eject stage, a check is performed to determine if the assemble station socket becomes empty for reuse. One implementation has four stages for assembly and ejection steps (FIG. 17), but this number could be large or smaller if more or less has to be done to each case as it is assembled.

Additional Features of the Case Assembler

The invention is "caliber agile." That is, through a set of routine changes in track spacing, magazine size changes, assembly station replacements, and insert receiver changes to retarget the assembly machine to make cases of different caliber. To change to a new caliber the user (a) replaces the assembly station socket (26) to the one sized for the new caliber; (b) replaces the case lower magazine to the one large enough for the new caliber (22); (c) replaces the case upper insertion receiver blocks (68) and the case insertion template (66) for the new caliber; (d) changes spacing for the case upper magazine/tracks for the new caliber (54) and (55); and (e) changes the retainer walls (16) and (47) on the bowl feeder both for uppers and lowers and the flip-up orienters for uppers only (42). Also the assembly machine programmed logic is changed so that translations, timing, and durations are suitable for the new caliber. Concluding, Step #3, is unnecessary for rounds that use brass, nickel or steel (metal) cases and is peculiar to the process for manufacturing polymer or plastic cases of multiple calibers using the methods described herein.

Step #4—Cartridge Assembly and Loading

There are many manufacturing processes for assembling primers into cases, filling cases with propellant, inserting bullets or balls into the primed and filled cases, and crimping the bullets or balls to keep them in place assuming brass, nickel or steel (metal) cases. A preferred assembly method is similar to that used in conjunction with Ammo Load Worldwide Mark L; however, the assembly system and method described herein are also compatible with assembling legacy metal cased ammunition because some assemblers will find the need to do this as well as new polymer rounds.

Figure 19:
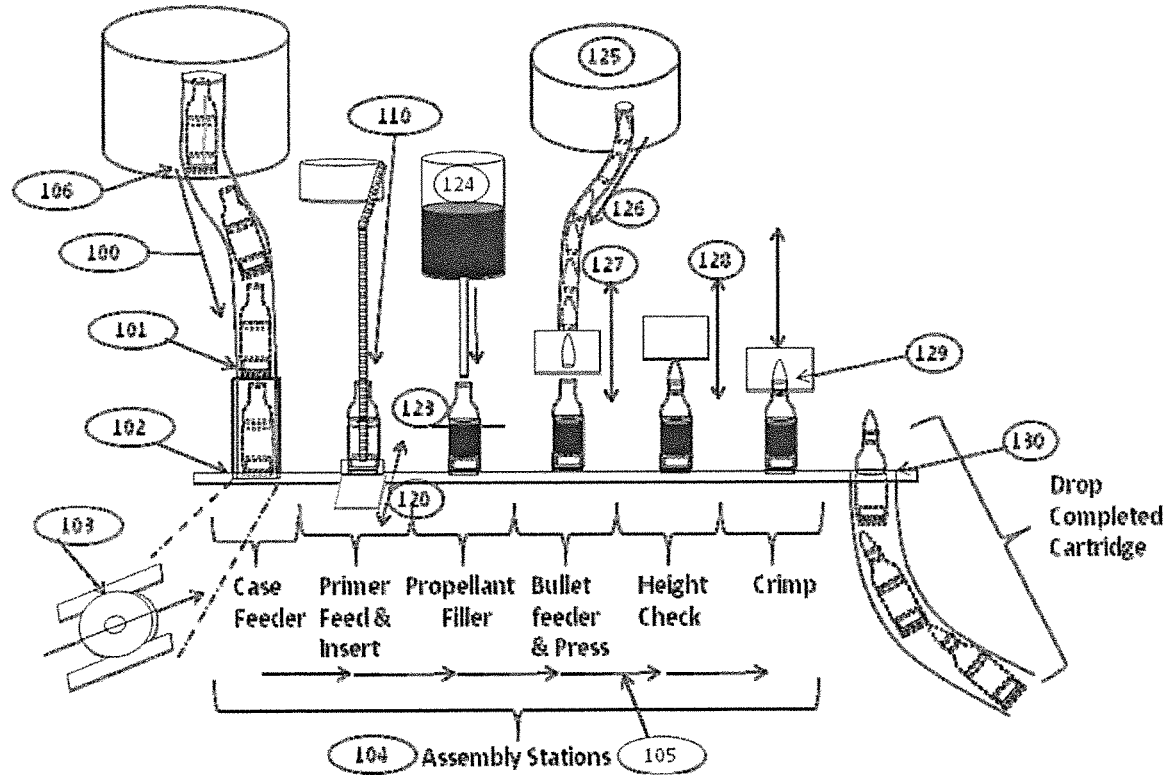
FIG. 19 diagrams an ammo loading process.
Figure 20:
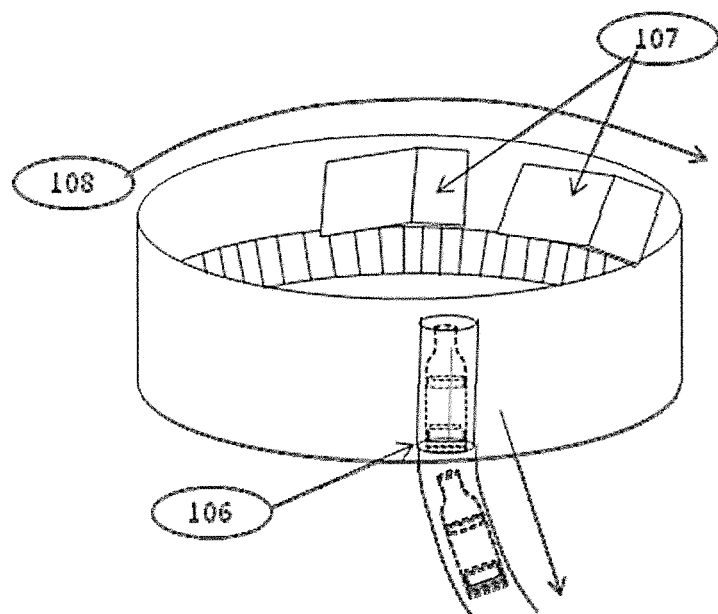
FIG. 20 shows rotating bowls with a shaped track for case and bullet feeding applications.
Figure 22:
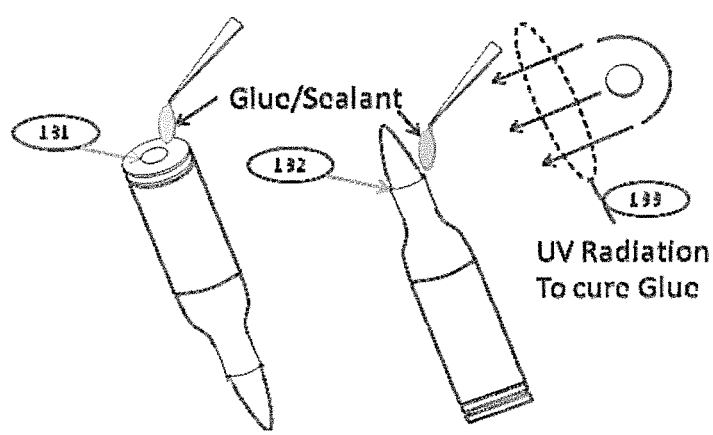
FIG. 22 depicts primer rim and bullet sealing.

The process outlined in FIG. 19 begins with a feeder (100) that presents cases to a feed tube head end first (101). There are many ways to implement this feeder, including vibratory bowls (FIG. 5), elevator conveyors followed by a shaped track to orient cases headend first (FIG. 4), or rotating (108) bowls (FIG. 20) with a shaped track to orient cases headend first. Regardless of approach the head-end oriented fully assembled cases feed through a tube and land in a vertical orientation to the assembly transfer line (102) which could also be a transfer drum or turn table in an alternative configuration). The transfer line clamps the case extractor grove (103) in a track and moves it from assembly station (104) to assembly station by shifting (or rotating) from one assembly point to the next in each assembly cycle (105).

A key modification to this stage takes into account that polymer cases are much more bottom heavy than are metal cases. This has the effect that polymer rounds fall differently into drop holes (106) than do metal cases (for instance, drop slower due to being overall lighter) and do not suffer being pinched by gates as well as metal cases do. To address this set of problems, the drop port (106) is held open long enough for the case to completely clear and not be pinched. Vanes (107) in the bowl feeder add more random feeding movement in the bowl to take advantage of the fact the polymer rounds have a very strong tendency to land from random motion in the head end down orientation (because they are so bottom heavy).

Figure 21:
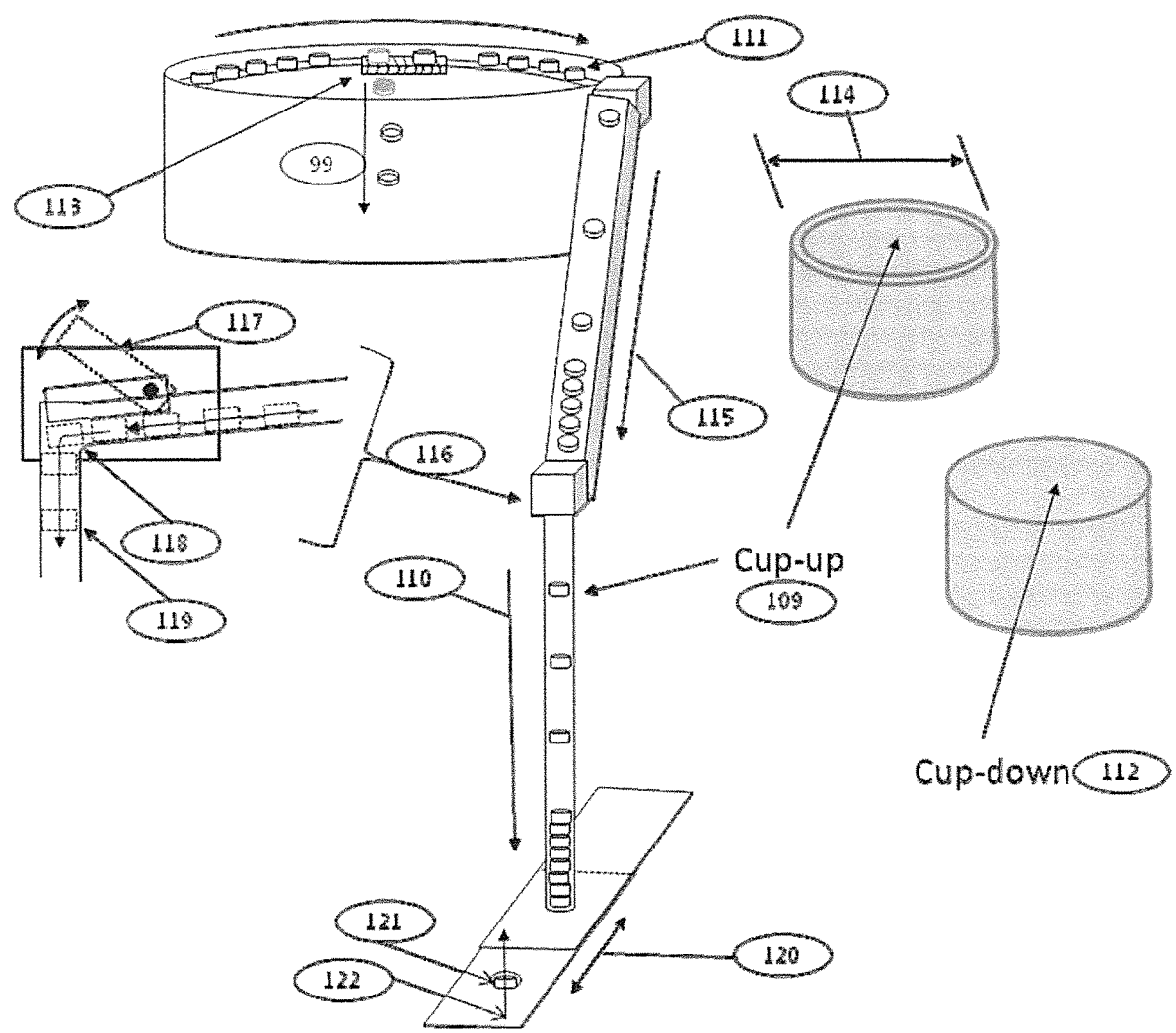
FIG. 21 illustrates primer feeding.

In parallel, a similar feeder (FIG. 21) presents primers cup-up (109) first to a smaller diameter feed tube (110). This is cup-up as fed from the bowl feeder (111). This feeder takes advantage of several features of primers. First, primers only slightly prefer to orient cup-down (112). Therefore an inverted primer is swept from the feeder race using a special diagonalized comb structure (113) that catches inverted primer (99) sharp edges and diverts them back into the bowl feeder for retry. The shape of this comb structure is tuned to the primer size (114) so alternative combs are required for different primer sizes. The feed is through a polished track (115) and a vertical tube (110) that is positioned alongside the assembly transfer line. The incline and track vibration is set to feed primers at a rate that is faster than the assembly machine inserts the primers. The interface between the track and the feed tube is diagrammed in (116). The critical features are the weight of the feed lever (117), which keeps primers level as they transition from the track to the tube, and the chamfer (118) that allows the primers to smoothly feed into the tube. Once in the tube, primers float evenly down the tube (119) on a cushion of air and land in the same orientation (cup facing up) as they had when they entered.

In the first assembly position, the case is shifted into place, a slider (120) moves a primer from the bottom of the primer feed tube, over and under the primer cavity (121) in the bottom of the case, and a linear actuated plunger (122) presses the primer up and into the case. A cartridge assembly system built by multiple vendors, including Ammo Load Worldwide referenced earlier, is used here. In this type of system, the slider linear actuation, the primer press actuation, and transfer of the case from one assembly station to the next is driven by cams and levers extracting power from a central motorized drive shaft in the cartridge assembly machine. This machine type is similar to that of Leich 4,228,724, but has been updated to provide automatic feeders and programmed logic sequence controls. In alternative designs these actuations could be driven by air linear or electric linear actuators.

At the next assembly station, the case is filled with a predetermined amount of propellant (123) from an overhead bin or jar-like container (124). At the next station, another feeder similar to the one used to feed cases (125), provides a stream of bottom oriented bullets (126) or balls for insertion into the casing from the top. The feeder for this alternates between dropping one bullet into place, transferring out of the way, and allowing a vertical press (127), that is moved down, to press the bullet into place. Indexing to the next station the machine assures that the bullet is pressed far enough into the case (128). In the final station it crimps the case to hold the bullet into place (129). For polymer ammunition the crimp step is disabled but the height test and adjustment is still enabled. In similar machines some or several of these steps can be separated into sub-operations in separate stations or combine in one based on the specific loader design.

At this point the cartridge is fully assembled, but not fixed or sealed in place, and is dropped through an exit hole (130) and through the transfer tube to the next stage of the process. The assembly machine can also be modified to accommodate alternative cartridge types and calibers. This is done by (a) reconfiguring the case feeder to support the different sized case (100); (b) reconfiguring the primer feeder by changing the sweep comb (113) and feed tube & track (110) & (115) to ones tuned to the alternative primer size, (c) changing the propellant feed amount (123); (d) reconfiguring the bullet feeder to support the different sized bullets or balls (125); and (d) adjusting the height sensor (128) and crimp (129) for the new round type. The cam action is also changed for differing round heights (i.e. assembly stage stroke length).

Step #5—Cartridge Sealing

The sealing requirements of polymer ammunition are different from those in metal case ammunition. In metal case ammunition, the bullet is held into the case by pressure created by case mouth crimping. In plastic ammunition, the bullet is held in to some extent by pressure created by expanding the plastic mount slightly, but fundamentally the bullet is held in by gluing. Therefore, while for some ammunition standards (notably for certain military specifications), metal rounds need to be sealed, for polymer ammunition we must seal and glue every bullet into the case for the ammunition to properly work.

The sealing process is typically to apply a drop of sealant or glue to the primer rim (131) so as to seal the back pocket from moisture incursion, and to seal or glue the rim around the case mouth and bullet (132) to also seal from moisture incursion, but to also provide a stronger bullet holding force that resists release of the bullet until sufficient thrust has been created within the case after propellant ignition. The consistency of release in plastic cased ammunition is one of its good characteristics and supports a more accurate release than is possible even for brass cases (which are well known to be better than steel cases). In the preferred embodiment, the applied glue or sealant is of an ultraviolet light cured variety so the sealed primer or bullet needs to be passed or held under an ultraviolet light (133) for a glue vendor specified period of time.

Figure 23:
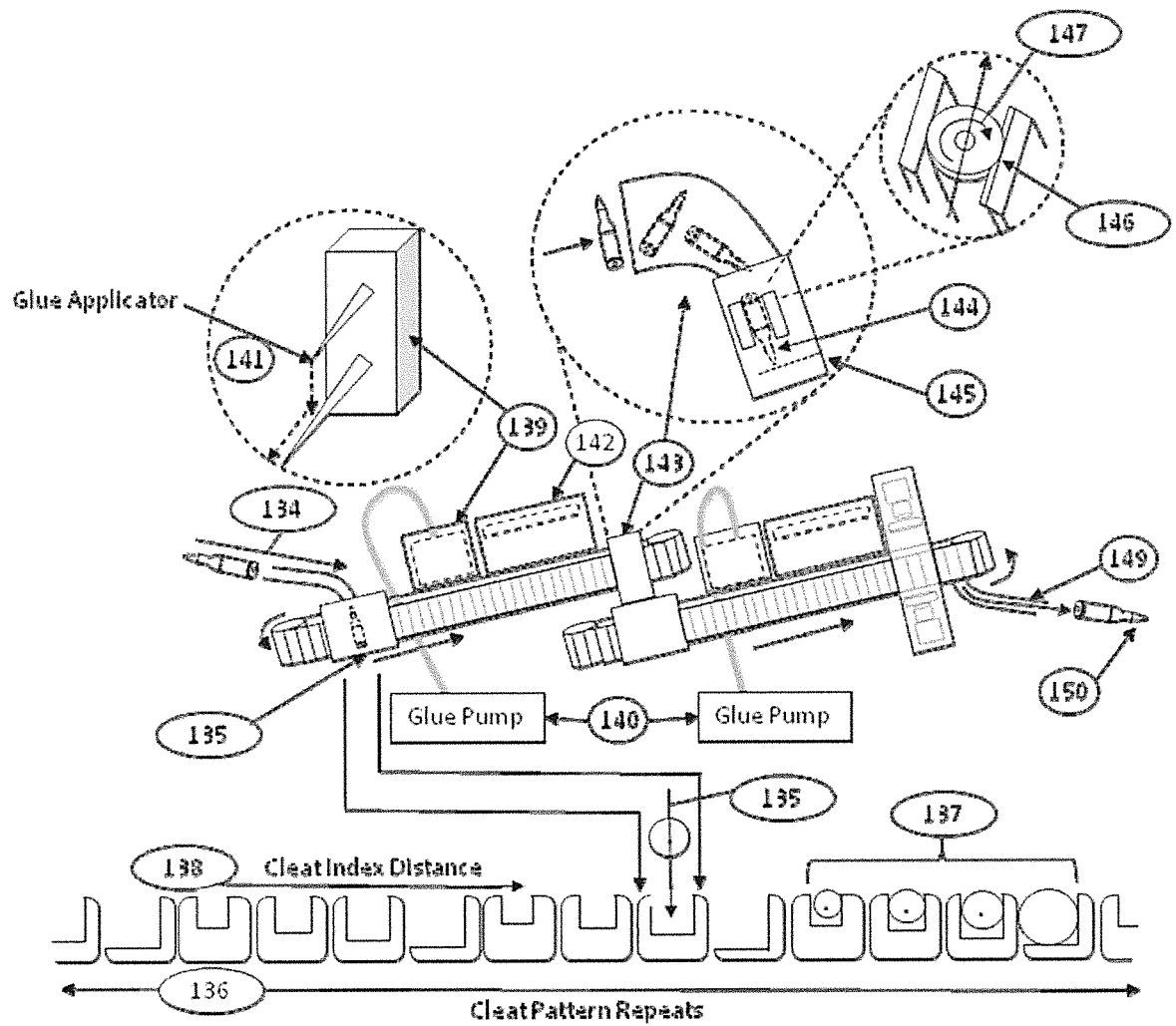
FIG. 23 shows a sealant machine architecture.

Referring to FIG. 23, the system collects the cartridges dropped from the cartridge assembly and loading after they travel a short distance in a tube channel (134). The rounds drop head end (bottom) first into a receiver chamber (135) and are pushed (with air or electric linear actuators) onto a conveyor into a cleat (136) sized for the round caliber (diameter). The belt supports repeated patterns of cleats (137), each pattern includes one cleat for each caliber or size of round that the sealing machine supports (so for instance, 4.37 mm, 5.56 mm, 7.63 mm, 8.38 mm are supported by a cleat set as shown in FIG. 23). At machine initialization time, the cleat pattern is identified by sensors that measure cleat size and spacing and use this information to synchronize the belt control system with the specific belt pattern of the machine (as the machine subsequently runs, this cleat synchronization is maintained by effectively re synchronizing in each belt motion sequence so the control and the belt remain in synchronicity continuously through operation). Each sealant machine cycle, the belt is indexed so that the selected cartridge in the receiver is lined up with the next cleat that fits that particular cartridge type (138).

The cleated cartridge is then indexed to the glue applicator (139), the glue pumping system (140) is cued to push out a properly sized drop of glue, and the applicator moves down and out (141) to the optimum position to apply the glue drop to the rim around the mouth of the cartridge. When the glue drop comes into contact with the rim, it is attracted around the rim by capillary action, which is reinforced as the cartridge indexes and rolls to and then moves under the glue curing light station. The round moves under the curing station (142) for an appropriate period to fully cure the glue and then is released from the cleat to fall and flip into another receiver chamber (143), but this time with the tip facing down (144).

This second belt replicates the cleat pattern of the first one and operates in synchronicity with the first, so that a cartridge in the receiver is pushed (with air or electric linear actuators) onto the synchronized conveyor into the correct cleat for the cartridge type. The resting position of the tip (145) in the receiver is set so that the case extractor (146) grove catches on a guide rail (146) and keeps the cartridge at a certain height and retained in the conveying system as it is indexed to a second glue/sealant stage. The cartridge again stops at the glue applicator, the glue pumping system is cued to push out a properly sized drop of glue, and the applicator moves down and out to the optimum position to apply the glue drop to the rim around the primer (132).

When the glue drop comes into contact with the primer edge, it is attracted around its rim by capillary action, which is reinforced as the cartridge indexes and rolls (147) to and then moves under the glue curing light station. The round moves under the curing station for an appropriate period to fully cure the glue. It then passes by a sealant inspection camera set (148) that illuminates the two glued rims (top, for the bullet, and bottom for the primer) in ultraviolet light. The glue, thus irradiated, fluoresces and is imaged by two inspection cameras that capture image data that is processed to present and good/bad assessment to downstream inspection and classification equipment disclosed in the next section. Then the cartridge falls into the inspection system (149) tip first (150).

This sealant machine is an improvement over the prior art in several ways. First, it supports multiple caliber cartridges without substantial round changeover because the cleat belt already supports multiple caliber cartridges inherently by employing multiple cleats in the same belt. The machine is also potentially quicker than older glue application machines because it indexes to receiver and glue station locations at high speed and with precision derived from the precision belt to controller synchronization that is maintained by the cleat pattern sensing algorithm. Further, the sealant applicator, which moves out and down to a preprogrammed distance accommodates to optimum glue application for multiple cartridge type which is critical for well formed polymer rounds.

Step #6—Cartridge Inspection

Figure 24:
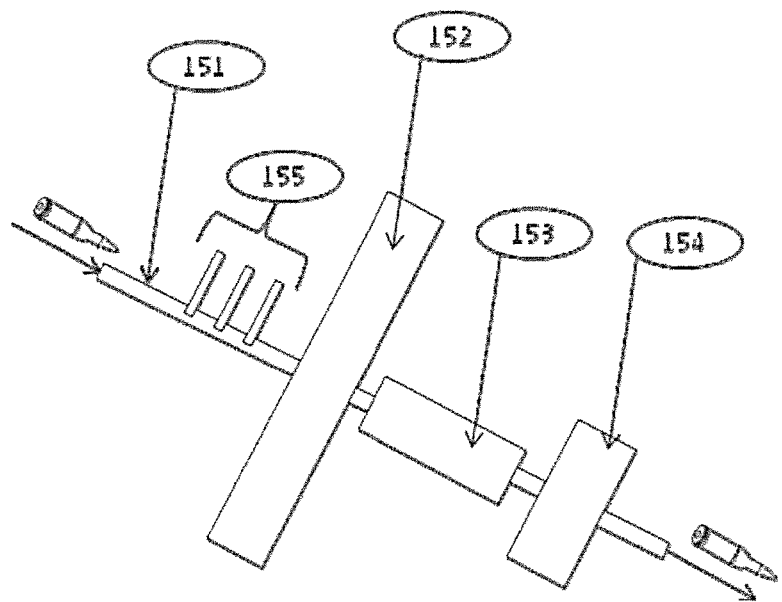
FIG. 24 is a schematic of an inspection system similar to that disclosed in published U.S. Patent Application No. 20050226489.

Referring to FIG. 24, the output of the sealant machine is an inspection stage providing a good/bad parameter for sealant quality and a stream of cartridges dropped on to a V-channel run as described in U.S. Patent Application Publication Nos. 2005/0226489 and application Ser. No. 13/834,909, the entire content of both being incorporated herein by reference. The v-channel could be replaced with a number of alternative conveyances, as described in the two published applications referenced above. The cartridges move down the v-channel (151) through inspection heads that include 360 degree profile measurements and surface images (side images) (152), front and back (tip and head-end) images (153), and overall full cartridge outline images (154).

The profile and side-images are taken with laser profilometers and line-scan cameras (152). The data is assembled by determining when the tip and head-end of the cartridge pass through a series of three laser presence and absence sensors (155). These sensors allow the inspection head to determine the time when the round passes through the sensor array and how fast it does so. This allows the inspection system to locate on the r cartridge where each line is scanned and uses this information to assemble the lines into a high precision 3D data collection that determines the full 360 surface and dimensions of the cartridge.

This data is then checked for surface blemishes and defects, dimensional errors, and approximate cartridge mass characteristics (which is related to how much propellant was loaded into the cartridge among other things). This data is used to determine round quality and good/bad parameters. The cartridge then passes through a head-end/tip imaging system (153) that capture images and processes them to determine that the bullet is well placed and centered, and the primer is properly placed, centered, and pressed to the correct depth. This data is also used to determine round quality and good/bad parameters.

The next inspection checks on the dimensional measurements taken by the profilometer/line scanning inspection system (154). It also measures the cartridge profile and verifies key dimensional like the base to tip measurement and the neck/shoulder to tip and base measurements. This data is also used to determine round quality and good/bad parameters. Addition sensors per US patent application Publication No. 2005/0226489 can be added to the inspection sequence if additional potential manufacturing defects need to be measured and can be added to the chain of good/bad parameter assessments (from Pub. No. 2005/0226489).

When the inspection system has collected all cartridge measurement and good/bad parameters it passes this data to the cartridge sortation system simultaneously with individual rounds being physically delivered to the sorter at the end of the inclined v-channel that passes through the inspection system.

Step #7—Cartridge Sortation

Figure 25:
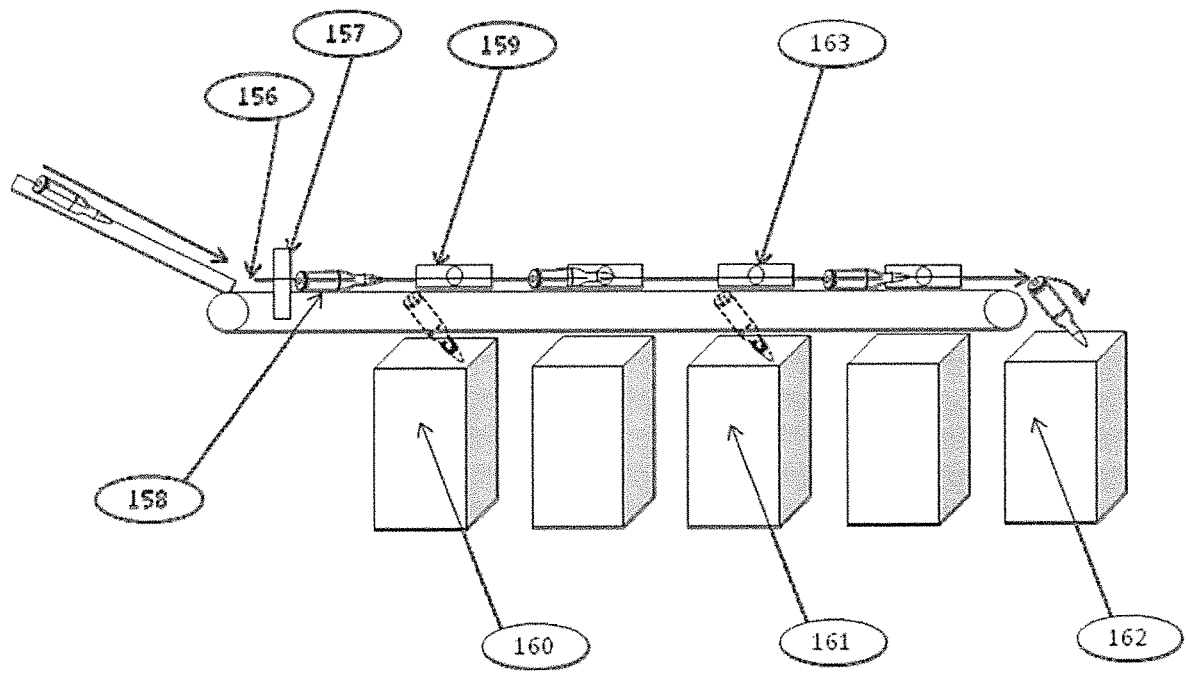
FIG. 25 diagrams a cartridge sortation machine.

The cartridge sorting machine of FIG. 25 comprises a landing area (156), a sensor that determines that a cartridge has landed (157), and a constant speed conveyor (158) that moves each cartridge past divert stages (159). The cartridge is scheduled for a certain diversion based on its assessed quality by the inspection stages and net good/bad assessment. A cartridge is diverted to the bad bin or track if it does not meet or exceed all operational parameters (160). All good rounds can be further diverted (161) to a quality level bin based on other measured variations (for instance amount of propellant loaded into the cartridge). The algorithm for good/bad and quality class diversion is parameter and program variable to meet the marketing needs of the particular munitions manufacturer. A final divert is provided to catch any rounds that are not previous diverted by good/bad or quality metric (162).

The divert stages work by using computer switched air pressure (163) at the moment when a cartridge passes by the bin or track to which it is to be diverted. In alternative embodiments, the divert stage could be implemented through an actuate gate mechanism or any other way of changing cartridge path.

Step #8—Cartridge Packaging

Figure 26:
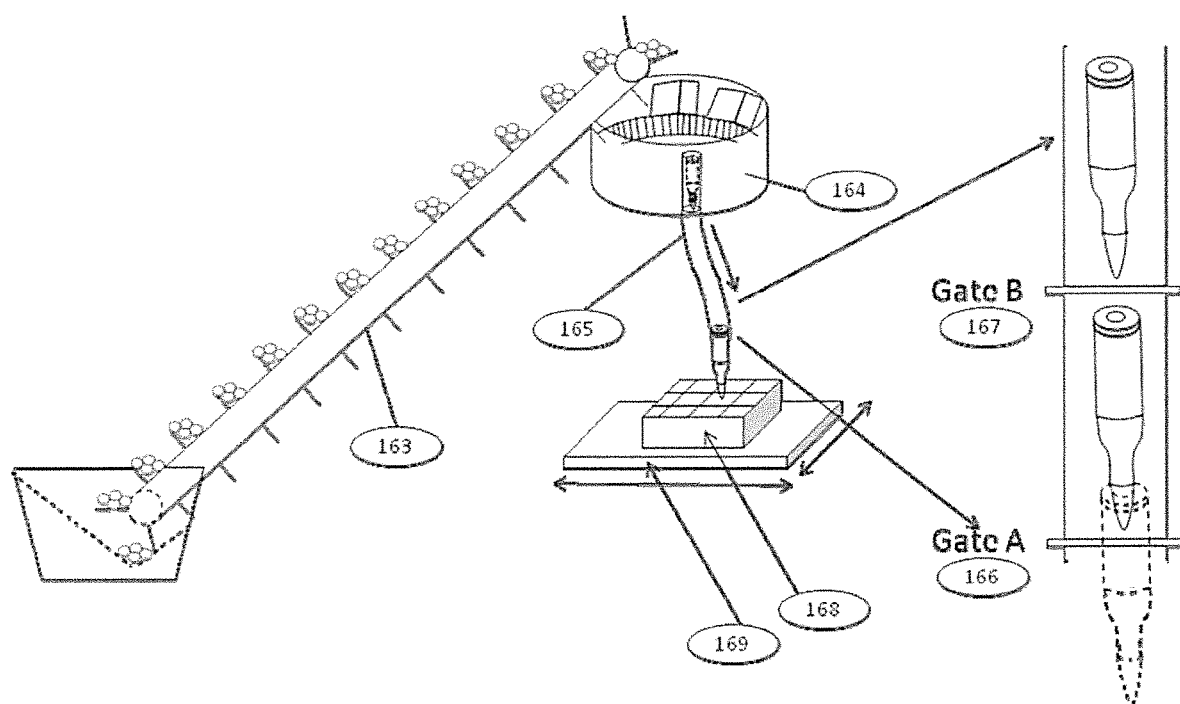
FIG. 26 depicts a rifle round packaging system.

Some systems place diverted cartridges into bulk bins or containers deemed full by count or weight. The full bin indication will stop all upstream manufacturing machines in the line until the full bin is removed and replaced. Other systems include a per cartridge packaging unit instead of a bin. FIG. 26 shows the preferred design of the automatic packaging of rifle cartridges. The first stage replaces the bin with a small elevator conveyor (163) that continuously transports completed and inspected cartridges from a feed bin (which is also an output bin from the sorter) to an upper feeder drum or bowl (164) like that shown in FIG. 20. The cartridges transported to the feeder bowl are mixed and tumbled until they enter a transport rail bullet end first (much like how the bullet feed works in the cartridge assembly and Loading machine) (165). They enter a tube tipped down and are trapped at the end of the tube by a double release trap. Gate A (166) opens to release the cartridge trapped between A and B. The Gate A closes and Gate B (167) opens to allow another cartridge to enter the area between A and B. In this way cartridges can be dropped one and a time.

Under the drop point is located an X-Y ammunition tray (168) which is moved in XY to each cartridge position in the tray (169). Removing full trays and replacing them with empty ones is either done manually or with a pick and place robotic unit. Trays can be readily place into boxes or shrink wrapped depending preferred take to market strategy. If the round type is pistol ammunition, alternative packager concepts based on round shape have been built (such as from Camdex), but these do not accommodate rifle cartridges.

The invention claimed is:

1. A system for manufacturing polymer ammunition, comprising:
    a case assembly station operative to join upper and lower polymeric case portions received from respective upper and lower case feed stations;
    a primer insert station operative to receive and insert primers into the assembled cases;
    a propellant fill station operative to receive and fill each assembled case with a propellant;
    a bullet insert station operative to insert bullets into the assembled, propellant-filled cases received from respective bullet and assembled case feeders; and
    wherein one or more of the stations include sensors and apparatus to place the station in a wait state until all components or materials needed by that station have been received.

2. The system of claim 1, wherein the upper and lower case feed stations include sensors and apparatus to ensure that case assembly station receives the proper number of case upper and lower portions prior to assembly.

3. The system of claim 1, wherein:
    the bullet and assembled case feeders deliver the bullets and cases along separate tracks in consecutive order; and
    wherein the bullet feeder includes sensors and apparatus to place the bullet insert station in a wait state until the proper number of cases and bullets are received for insertion.

4. The system of claim 1, wherein the assembled case feeder includes apparatus for conveying the cases in a preferred orientation.

5. The system of claim 1, wherein:
    the case feeder includes apparatus for conveying the cases in a preferred orientation; and
    apparatus for recycling non-oriented cases back into the feeder to assume the preferred orientation.

6. A system of claim 1, further including a height check station after the bullet insert station.

7. A system of claim 1, further including a sealing station operative to apply a glue or other bonding agent to a region of attachment between each bullet and the case into which it was inserted.

8. A system of claim 7, wherein the glue or other bonding agent includes one or more of the following:
    ultraviolet light (UV) cured adhesives,
    thermally cured adhesives,
    ultrasonic welding, and
    fiction welding.

9. A system of claim 1, wherein:
    each primer has a peripheral rim; and
    further including a sealing station operative to apply a glue or other bonding agent to the rim after the primer is inserted into head end of a case.

10. The system of claim 1, including one or more elevator feeders, each with a shaped track to orient case uppers and case lowers into a standard orientation for insertion into the case assembly station.

11. The system of claim 1, including one or more vibratory bowl feeders, each with a shaped track to orient case upper and lower portions into a standard orientation for insertion into the assembly station.

12. The system of claim 1, including one or more robotic pick-and-place feeders to acquire and place a case upper or lower portions one piece at a time or multiple pieces at once into the case assembly station.

13. The system of claim 1, further including an automated inspection station that checks physical parameters of the ammunition and rejects rounds that do not meet predetermined characteristics.

14. The system of claim 13, including one or more of the following predetermined characteristics:
    overall profile,
    outer surface quality,
    placement or centering of bullet, and
    placement or centering of primer.

15. The system of claim 13, further including a sortation machine that diverts the ammunition into different lots based upon quality.

16. The system of claim 1, further including a packaging machine that loads acceptable rounds of ammunition into boxes or containers.

17. The system of claim 1, including modular stations facilitating rapid changeover to accommodate ammunition of differing calibers.

\* \* \* \* \*